United States Patent
Baglin et al.

(10) Patent No.: US 8,995,664 B2
(45) Date of Patent: Mar. 31, 2015

(54) SECURITY IN WIRELESS COMMUNICATION SYSTEM AND DEVICE

(71) Applicant: Motorola Mobility LLC, Libertyville, IL (US)

(72) Inventors: Matthieu Baglin, Toulouse (FR); Lionel F. Ulmer, Toulouse (FR)

(73) Assignee: Google Technology Holdings LLC, Mountain View, CA (US)

( * ) Notice: Subject to any disclaimer, the term of this patent is extended or adjusted under 35 U.S.C. 154(b) by 114 days.

(21) Appl. No.: 13/914,688

(22) Filed: Jun. 11, 2013

(65) Prior Publication Data

US 2014/0026180 A1 Jan. 23, 2014

(30) Foreign Application Priority Data

Jul. 17, 2012 (EP) .................................. 12290236

(51) Int. Cl.
*H04L 9/00* (2006.01)
*H04W 12/08* (2009.01)
(Continued)

(52) U.S. Cl.
CPC .............. *H04W 12/08* (2013.01); *H04W 12/04* (2013.01); *H04W 84/042* (2013.01); *H04W 92/10* (2013.01)
USPC ........... 380/270; 380/273; 380/277; 713/171; 455/410

(58) Field of Classification Search
None
See application file for complete search history.

(56) References Cited

U.S. PATENT DOCUMENTS 6,195,677 B1 * 2/2001 Utsumi ........................ 709/201
7,450,721 B2 11/2008 Farnsworth et al.
(Continued)

FOREIGN PATENT DOCUMENTS

EP 2381713 A1 10/2011
WO 2007127972 A2 11/2007
(Continued)

OTHER PUBLICATIONS

"3rd Generation partnership Project; Technical Specification Group Services and System Aspects; 3GPP System Architecture Evolution (SAE); Security architecture (Release9)", 3GPP Standard; 3GPP TS 33.401, 3rd Generation Partnership Project (3GPP), Mobile Competence Centre; 650, Route Des Lucioles; F-06921 Sophia-Antipolis Cedex; France, vol. SA WG3, No. V9.7.0, Jun. 16, 2011, all pages.
(Continued)

*Primary Examiner* — Jason K. Gee
*Assistant Examiner* — Zhimei Zhu
(74) *Attorney, Agent, or Firm* — Lerner, David, Littenberg, Krumholz & Mentlik, LLP

(57) ABSTRACT

A method of implementing security in a wireless communication device (108) comprises receiving (300), at the device (108), a security mode command for activating a security mode in the device and storing a sequence number of the received security mode command. A security mode complete or failure message is sent (302) based on whether a security mode is activated in the device. An acknowledgement of the security mode complete or failure message is received (304) and a timestamp of the acknowledgement is stored. On receiving a PDU, sequence numbers and timestamps of segments of the received PDU are compared (306) with the stored sequence number and timestamp of the acknowledgement. The received PDU segments are managed (308) in response to the comparisons, and the sending of the security mode complete or security mode failure message. A wireless communication device is also disclosed.

15 Claims, 5 Drawing Sheets

(51) Int. Cl.
*H04W 12/04* (2009.01)
*H04W 84/04* (2009.01)
*H04W 92/10* (2009.01)

(56) References Cited

U.S. PATENT DOCUMENTS

| | | | | |
|---|---|---|---|---|
| 8,140,851 | B1* | 3/2012 | Mynam et al. | 713/178 |
| 8,515,073 | B2* | 8/2013 | Arunan | 380/273 |
| 2003/0076859 | A1* | 4/2003 | Jiang | 370/509 |
| 2003/0100291 | A1* | 5/2003 | Krishnarajah et al. | 455/410 |
| 2003/0221098 | A1* | 11/2003 | Chen et al. | 713/153 |
| 2005/0036619 | A1* | 2/2005 | Funnell et al. | 380/256 |
| 2005/0282521 | A1* | 12/2005 | Hermann et al. | 455/410 |
| 2006/0050679 | A1* | 3/2006 | Jiang | 370/350 |
| 2006/0072758 | A1* | 4/2006 | Farnsworth et al. | 380/270 |
| 2007/0101129 | A1* | 5/2007 | Wong et al. | 713/160 |
| 2007/0153793 | A1* | 7/2007 | Jiang | 370/390 |
| 2007/0155339 | A1* | 7/2007 | Jiang | 455/73 |
| 2007/0204159 | A1* | 8/2007 | Hara | 713/171 |
| 2007/0263871 | A1* | 11/2007 | Maheshwari et al. | 380/270 |
| 2007/0265875 | A1* | 11/2007 | Jiang et al. | 705/1 |
| 2008/0083011 | A1* | 4/2008 | McAlister et al. | 726/1 |
| 2009/0025060 | A1 | 1/2009 | Mukherjee et al. | |
| 2009/0111423 | A1 | 4/2009 | Somasundaram et al. | |
| 2010/0020976 | A1* | 1/2010 | Ma | 380/278 |
| 2010/0153725 | A1* | 6/2010 | Koo et al. | 713/170 |
| 2010/0246382 | A1 | 9/2010 | Yi et al. | |
| 2010/0284535 | A1* | 11/2010 | Sharma et al. | 380/270 |
| 2011/0119487 | A1* | 5/2011 | Alexander et al. | 713/160 |
| 2011/0150223 | A1* | 6/2011 | Qi et al. | 380/273 |
| 2011/0164752 | A1* | 7/2011 | Wainner et al. | 380/277 |
| 2011/0263222 | A1* | 10/2011 | Farnsworth et al. | 455/410 |
| 2012/0026864 | A1* | 2/2012 | Jactat | 370/216 |
| 2012/0159151 | A1* | 6/2012 | Janakiraman et al. | 713/153 |
| 2012/0183142 | A1* | 7/2012 | Sharma | 380/273 |

FOREIGN PATENT DOCUMENTS

| | | |
|---|---|---|
| WO | 2009012281 A2 | 1/2009 |
| WO | 2009022803 A1 | 2/2009 |

OTHER PUBLICATIONS

European Search Report, Munich, Dec. 21, 2012, all pages.

\* cited by examiner

US 8,995,664 B2

SECURITY IN WIRELESS COMMUNICATION SYSTEM AND DEVICE

FIELD OF THE DISCLOSURE

The present disclosure relates generally to wireless communications and, more particularly, to implementing security in wireless communication systems and devices, for example Long Term Evolution (LTE) compliant devices.

BACKGROUND

There have been several field test issues reported in 3rd Generation Partnership Project (3GPP) Long Term Evolution (LTE) network coverage, where a wireless communication device (known as user equipment (UE)) fails a security mode procedure and incorrectly interprets messages subsequently sent by the network.

In 3rd Generation Partnership Project (3GPP) Long Term Evolution (LTE) networks, when the UE is in a connected state, the network can initiate a security mode procedure to activate Access Stratum (AS) security. AS security provides integrity protection for Radio Resource Control (RRC) signaling and provides ciphering of RRC signaling (SRB) and user data (DRB). 3GPP TS 33.401 V9.7.0 states as follows:

RRC downlink ciphering (encryption) at the eNB shall start after sending the AS security mode command message. RRC uplink deciphering (decryption) at the eNB shall start after receiving and successful verification of the AS security mode complete message. RRC uplink ciphering (encryption) at the UE shall start after sending the AS security mode complete message. RRC downlink deciphering (decryption) at the UE shall start after receiving and successful verification of the AS security mode command message.

If the security mode procedure is activated successfully in the UE in response to a security mode command message, the UE normally decodes subsequent messages sent by the network as ciphered messages and starts ciphering messages to be sent to the network. If the security mode procedure is not activated in the UE in response to a security mode command message, the UE can receive ciphered blocks but the UE will interpret the blocks as un-ciphered. For example, if the security mode is not activated in the UE in response to a security mode command message sent by the network, when the UE receives a ciphered message from the network, the UE may wrongly interpret it as another message and may then perform operations which are not consistent with the initial message sent by the network. In such a case, the network and the UE would be unsynchronized.

3GPP TS 36.331 V9.10.0 entitled Evolved Universal Terrestrial Radio Access (E-UTRA); Radio Resource Control (RRC); Protocol specification describes AS and Non-Access Stratum (NAS) security mode procedures.

U.S. Publication No. 2009/0025060 A1 entitled "Method and Apparatus to Implement Security in a LTE Wireless Device" describes a method for implementing security in a LTE wireless device (UE), comprising receiving a Non-Stratum Access (NAS) message, e.g. a Packet Data Convergence Protocol (PDCP) PDU, which includes security parameters, determining whether the security parameters are correct, and performing a security procedure based on the determination. In the U.S. Publication No. 2009/0025060, if the security parameters are not correct, the UE may disregard or drop the message, report a failure to another protocol layer, initiate re-authentication.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

The present disclosure will be described with reference to a wireless communication device capable of operating with a Long Term Evolution (LTE) wireless communication network. It will however be appreciated that the present disclosure may apply to other types of wireless communication networks, such as other 4G networks or the like. By describing the disclosure with respect to a LTE communication network, it is not intended to limit the disclosure in any way.

The wireless communication device may be a portable or mobile telephone, a Personal Digital Assistant (PDA), a wireless video or multimedia device, a portable computer, a netbook, a tablet device, an embedded communication processor or similar wireless communication device. In the following description, the wireless communication device will be referred to generally as a UE for illustrative purposes and it is not intended to limit the disclosure to any particular type of wireless communication device.

Figure 1:
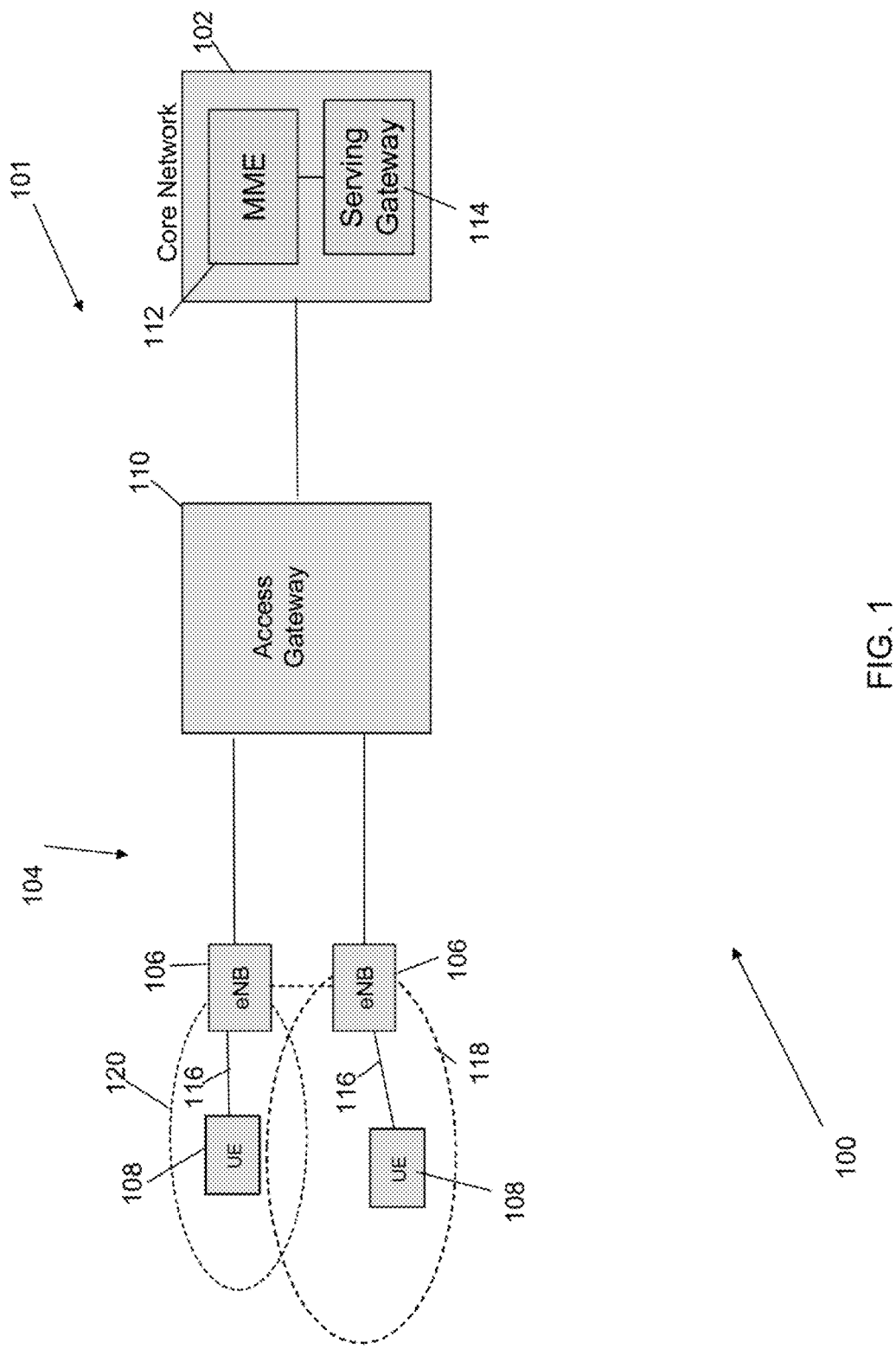
FIG. 1 is a block diagram of a communication system in accordance with an example embodiment of the present disclosure.

Referring now to FIG. 1, a wireless communication system 100 in accordance with an example of an embodiment of the disclosure comprises a LTE network 101 (known as the Evolved Packet System (EPS) including a core network 102, sometimes known as the Evolved Packet Core (EPC), and an Evolved UMTS Terrestrial Radio Access Network (E-UTRAN) 104. The E-UTRAN 104 comprises a plurality of access points (known as evolved NodeBs (eNB) in LTE) 106 for communicating with a plurality of UEs 108 (only two of which are shown in FIG. 1). Although shown as eNBs, each access point 106 may be any other type of similar wireless interfacing element in a wireless communication system. The E-UTRAN 104 further comprises an access gateway 110 coupled to each of the plurality of eNBs 106, and for coupling to the core network 102. The access gateway 110 may be divided into a part that handles processing of user data and a part that handles control data or signaling.

As is well known, the LTE network 101 provides communication to UEs via a plurality of cells or serving areas (such as cells/areas 118 and 120 in FIG. 1), with each cell or area served by one or more eNBs 106. An interface for transmitting user traffic or control traffic may be used between eNBs 106. A UE 108 communicates with one of the eNBs 106 via a radio communication link 116 when the UE 108 is in a cell or serving area (such as cell 118, 120) served by the eNB 106.

In an example embodiment, the core network 102 comprises a serving gateway (SGW) 114 that routes and forwards user data and a Mobility Management Entity (MME) 112. The MME 112 is a control node for the wireless communication system 100. The functions of the MME 112, for example, include: it is responsible for idle mode UE location tracking and paging procedures including retransmissions; it is responsible for authorizing and facilitating the bearer activation/deactivation process and is also responsible for choosing the SGW for a UE at the initial attach and at time of handover; it is responsible for authenticating the user (by interacting with the HSS); the Non-Access Stratum (NAS) signaling terminates at the MME and it is also responsible for generation and allocation of temporary identities to UEs; it checks the authorization of the UE to camp on the service provider's Public Land Mobile Network (PLMN) and enforces UE roaming restrictions. The core network 102 further comprises a packet gateway (not shown) which provides connectivity to external data networks (not shown), such as the Internet, and/or an IP Multimedia Subsystem (IMS) network, in order to provide services to or from the UE 108. The functions of the SGW 114, the MME 112 and the packet gateway (not shown) are well known in the art. The core network 102 includes other elements which are not shown in FIG. 1 for simplicity but which are well known in the art.

Figure 2:
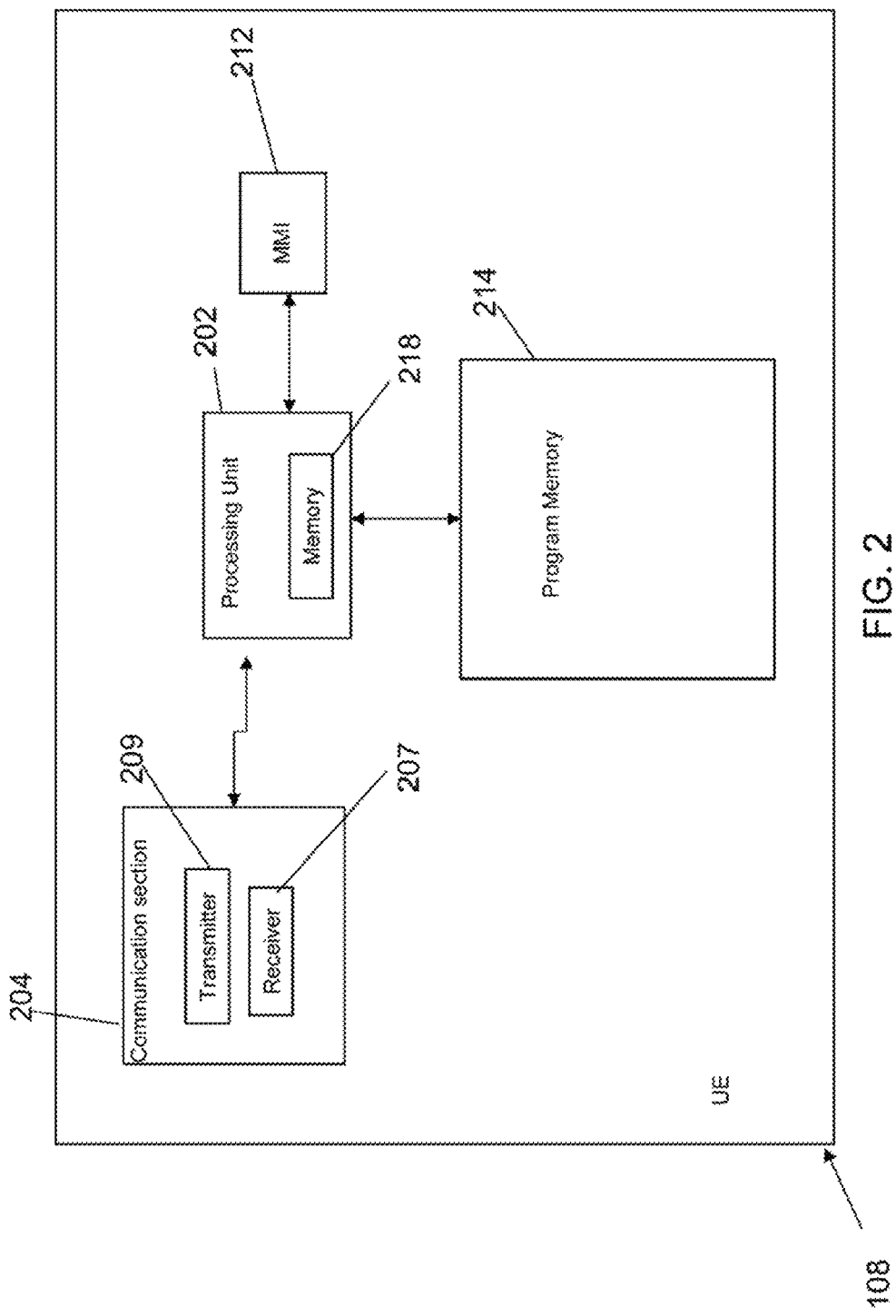
FIG. 2 is a block diagram of a wireless communication device in accordance with an example embodiment of the present disclosure.

FIG. 2 is a block diagram of a wireless communication device, such as a UE 108 shown in FIG. 1, in accordance with an embodiment of the disclosure. As will be apparent to a person of ordinary skill in the art, FIG. 2 shows only the main functional components of an exemplary UE 108 that are necessary for an understanding of the invention.

The UE 108 comprises a processing unit 202 for carrying out operational processing for the UE 108. The UE 108 also has a communication section 204 for providing wireless communication via a radio communication link with, for example, the eNB 106 of the E-UTRAN 104. The communication section 204 typically includes at least one antenna (not shown), at least one receiver 207 and at least one transmitter 209, at least one modulation/demodulation section (not shown), and at least one coding/decoding section (not shown), for example, as will be known to a person of ordinary skill in the art and thus will not be described further herein. The communication section 204 is coupled to the processing unit 202.

The UE 108 also has a Man Machine Interface MMI 212, including elements such as a key pad, microphone, speaker, display screen, for providing an interface between the UE 108 and the user of the UE 108. The MMI 212 is coupled to the processing unit 202.

The processing unit 202 may be a single processor or may comprise two or more processors carrying out all processing required for the operation of the UE 108. The number of processors and the allocation of processing functions to the processing unit is a matter of design choice for a person of ordinary skill in the art. The UE 108 also has a program memory 214 in which are stored programs containing processor instructions for operation of the UE 108. The programs may contain a number of different program elements or subroutines containing processor instructions for a variety of different tasks, for example: communicating with the user via the MMI 212; processing signaling messages received from the LTE network 101; performing neighboring coverage area measurements; implementing one or more security modes in the UE 108. The program memory 214 may store program elements which, when run on the processing unit 202, control the UE 108 to perform the method of implementing security in the UE in accordance with the disclosure. The program memory 214 may store one or more security algorithms for implementing security.

The UE 108 may further include a memory 218 for storing information. The memory 218 is shown in FIG. 2 as part of the processing unit 202 but may instead be separate (e.g. part of program memory 214).

Figure 3:
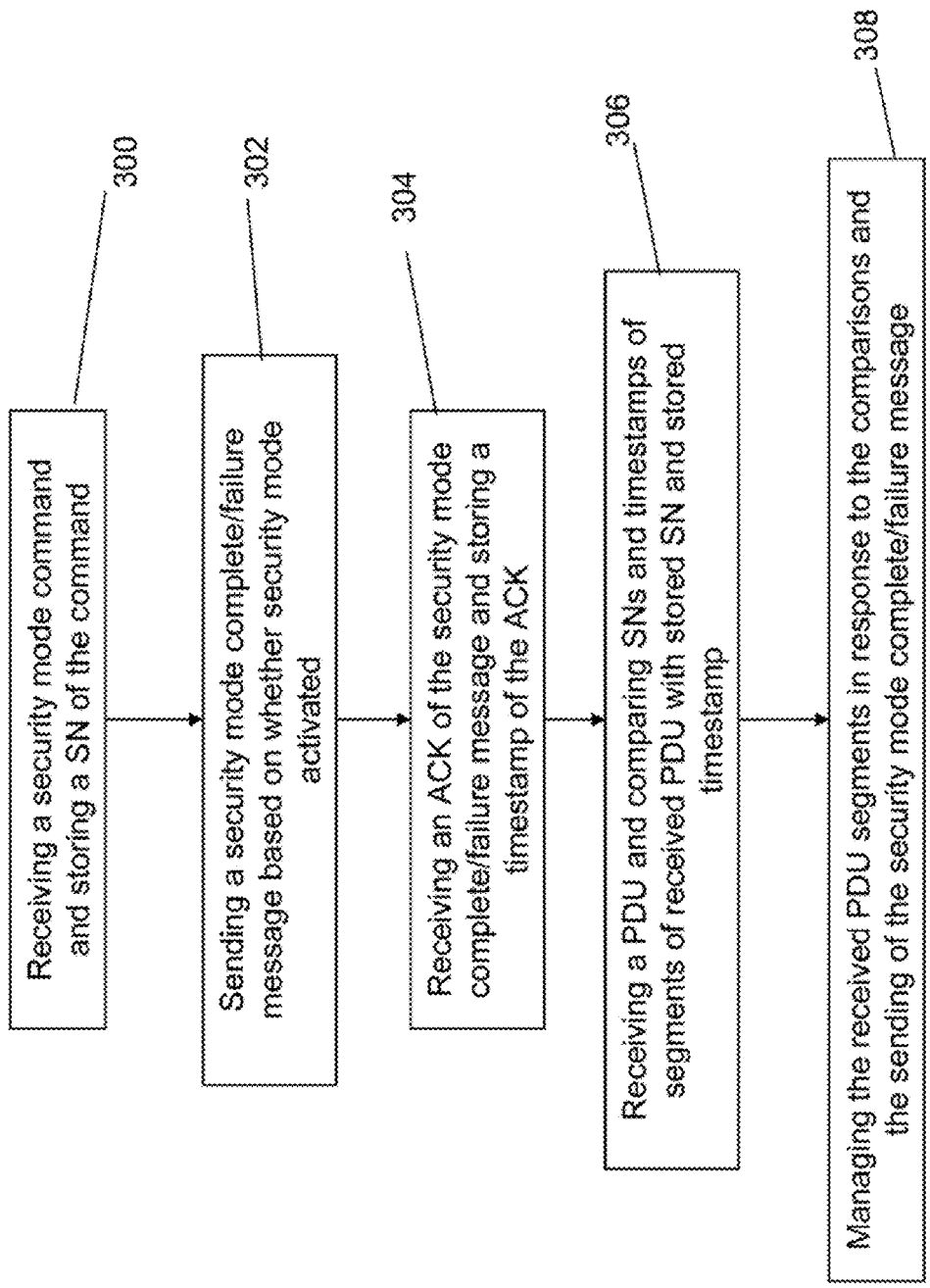
FIG. 3 is a flow diagram showing an example method of implementing security in a wireless communication device in accordance with an embodiment of the disclosure.
Figure 4:
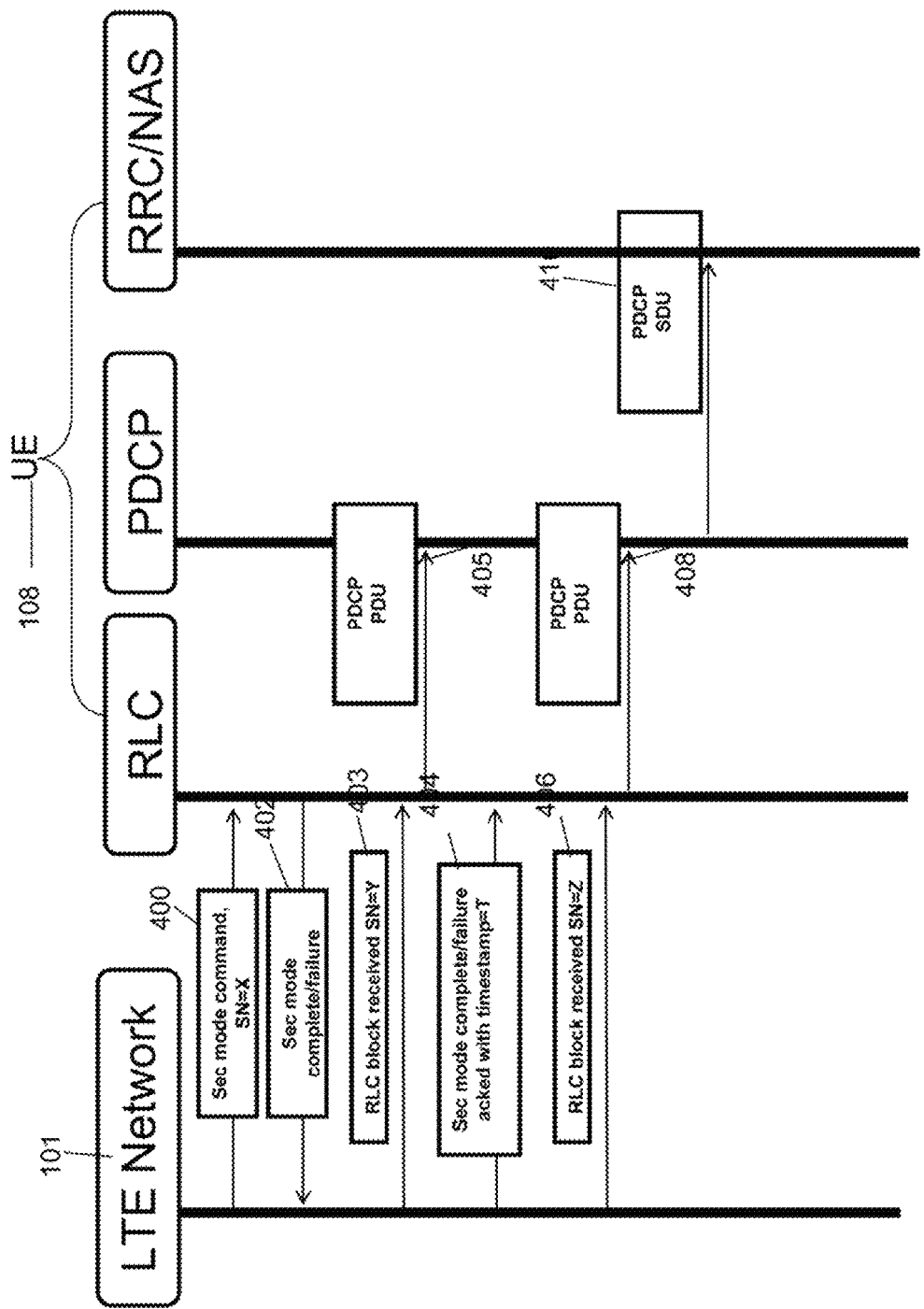
FIG. 4 is a diagram showing an example message flow between the wireless communication device and LTE network of the communication system of FIG. 1 for an example method of implementing security in a wireless communication device in accordance with an embodiment of the disclosure.
Figure 5:
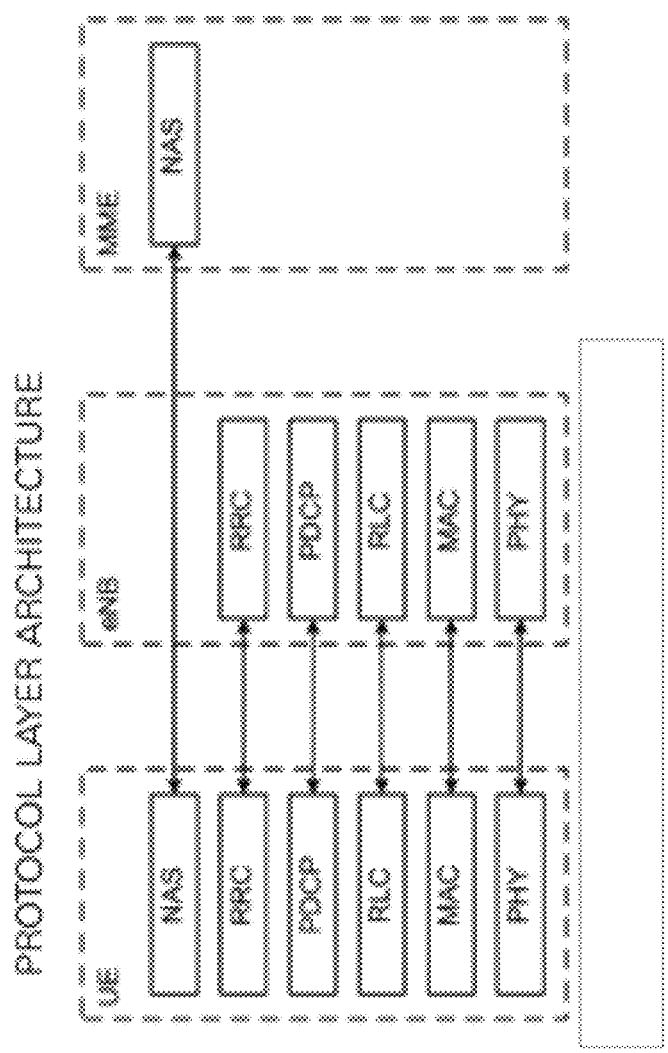
FIG. 5 is a diagram showing a control plane protocol stack for a LTE network.

FIG. 3 shows steps of a method of implementing security in a wireless communication device in accordance with an example embodiment of the disclosure. The method shall be described with reference to the communication system 100 of FIG. 1 and the UE 108 of FIG. 2 by way of example. Reference will also be made to FIG. 4 which shows an example message flow between the LTE network 101 and the different layers of the control plane of the UE 108 for the method of implementing security in a UE in accordance with an example embodiment of the disclosure. FIG. 5 shows the control plane protocol layers between the UE 108 and eNB 106 and between the UE 108 and MME 112. The control plane of UE 108 includes a Radio Link Control (RLC) layer, a Packet Data Control Protocol (PDCP) layer and a Radio Resource Control (RRC)/Non-Access Stratum (NAS) layer. The PDCP layer performs the ciphering (encryption) and deciphering (decryption) when security is activated in the UE 108 as is well known in the art.

As discussed in the introduction, in LTE networks, when the UE is in a connected state, the LTE network 101 can initiate a security mode procedure to activate security in the LTE network 101 and the UE 108 so as to protect messages exchanged between the UE 108 and the LTE network 101. In order to activate security in the UE 108, the LTE network 101 sends a security mode command to the UE 108. As soon as the LTE network 101 sends the security mode command, the LTE network 101 starts ciphering (encrypting) messages according to the security mode on which the security mode command is based. The security mode command message includes information indicating the security algorithm(s) and security parameters to be used by the UE 108 in order to implement security in the UE 108 and so as to be synchronized with the security mode used in the LTE network 101.

In LTE currently, there are two levels of security procedures: Access Stratum (AS) and Non Access Stratum (NAS). With these procedures, ciphering mechanisms can be used to provide signaling and user data confidentiality between the UE and the EPS, and integrity and replay mechanisms can be used to provide signaling and user data integrity. The security algorithms currently implemented in LTE include: for encryption, EPS Encryption Algorithms (EEA) as specified in 3GPP TS 33.401, including 128-EEA0 (Null ciphering algorithm), 128-EEA1 (SNOW 3G) and 128-EEA2 (AES); and for integrity, the EPS Integrity Algorithms (EIA) as also specified in 3GPP TS 33.401, including 128-EIA1 (SNOW 3G) and 128-EIA2 (AES).

As indicated above, the program memory 214 may store one or more security algorithms for implementing security in the UE 108. The UE 108 indicates to the LTE network 101 which security algorithms it supports in the attach request it sends to the network at power-up.

The LTE network 101 may initiate security at any time the UE 108 is in a connected state and messages between the user and the network are to be protected: for example, on RRC connection establishment, before the UE is attached or after the UE is attached. A UE 108 is in a connected state when a connection has been setup by the network for communication between the UE 108 and E-UTRAN 104. 3GPP TS 36.331

V9.10.0 & TS 33.401 V9.7.0 provide more details of security mode procedures in LTE communication systems.

In an embodiment of the disclosure, at step 300, the UE 108 is connected to the LTE network 101 and receives via the receiver 207 a security mode command for activating a security mode in the UE 108. The security mode command is sent or encapsulated in a message which includes information identifying a sequence number SN of the security mode command message (that is, the SN of the security mode command). The UE 108 stores the sequence number SN of the received security mode command. For example, the SN may be stored in memory 218 or program memory 214. In an example arrangement, the initiated security may be AS security for Radio Resource Control (RRC) signaling messages transferred through Signaling Radio Bearers (SRBs) as well as RRC user data transferred through Data Radio Bearers (DRBs). In order to activate AS security in the UE 108, the LTE network 101 sends an AS security mode command in a RLC message (message 400 in FIG. 4) which includes a RLC sequence number (SN=X) for the AS security mode command in the RLC header. As shown in the example message flow in FIG. 4, the security mode command sent in a RLC message 400 is received at the RLC layer of the UE 108 and the RLC sequence number (SN=X) for the message 400, which is provided in the RLC header, is stored.

At step 302, a security mode complete or failure message is sent based on whether a security mode is activated in the UE 108. A security mode complete message is sent when a security mode is activated in the UE 108 and a security mode failure message is sent when a security mode is not activated in the UE 108. A security mode is activated in the UE 108, when the UE 108 determines that the UE 108 can implement the security in response to the security mode command. As an example, the security mode is activated in the UE 108, when the UE 108 determines that it can support the security algorithm and security parameters to be used to implement security (e.g. as indicated in the security mode command message) and the UE 108 verifies the integrity of the security mode command. If the UE 108 determines that it cannot support the security algorithm and security parameters to be used to implement security or if the verification of the integrity of the security mode command fails, the UE 108 does not activate the security mode and sends a security mode failure message. The determining whether the security algorithm and security parameters are supported, verifying the integrity of the security mode command and the activating, not activating, of the security mode may be performed by the UE 108 under the control of the processing unit 202. With the example of FIG. 4, the security mode complete/failure message is sent to the LTE network 101 from the UE 108 as a RLC message 402.

On receipt of the security mode complete/failure message, the LTE network 101 sends an acknowledgement to the UE 108. The UE 108 receives, at step 304, the acknowledgement of the security mode complete or failure message and stores a timestamp of the acknowledgement. On receipt of the acknowledgment, the UE 108 knows that the LTE network 101 is in a security mode consistent with the security applied by the UE 108: that is, the UE 108 and LTE network 101 are both either applying security or not. The timestamp may be computed by the UE 108 (e.g. by means of the processing unit 202) as an absolute time when the acknowledgement is received at the UE 108. In the example of FIG. 4, the acknowledgement is sent as a RLC ACK message 404 having a timestamp T. The acknowledgement indicates that the LTE network 101 is synchronized with the UE 108 regarding implementing security. For example, when the LTE network 101 sends an acknowledgement in response to receiving a security mode failure message, the LTE network 101 stops ciphering messages in line with the UE 108. When the LTE network sends an acknowledgement in response to receiving a security mode complete message, the LTE network 101 continues ciphering messages in line with the UE 108.

Following sending of a security mode complete/failure message, on receipt of a Packet Data Unit (PDU) (e.g. sent by the LTE network 101), the UE 108, at step 306, compares the sequence numbers and timestamps of segments of the received PDU with the stored sequence number and timestamp of the acknowledgement. The timestamp of the acknowledgement and the timestamp of a segment of the received PDU correspond to the time of receipt at the UE 108 of the acknowledgment and the segment or information on which the segment is based. The UE 108 is configured to manage the received PDU segments at step 308 in response to the comparisons, and the sending of the security mode complete or security mode failure message. The managing of the received PDU segments may include applying or not applying security to the received PDU segments depending on the sending of the security mode complete/failure message and the sequence numbers and timestamps of the received PDU.

In an example arrangement, the PDU is a PDCP PDU received at the PDCP layer of the UE 108 and the PDCP layer (e.g. by means of the processing unit 202) performs the comparison. The PDCP PDU includes RLC segments of information received in RLC messages received at the UE 108. Multiple RLC segments can form a PDCP packet. Thus, older PDCP PDUs or frames may be received later than more recent ones based on the quality of the radio link and the RLC message retransmissions. In the example of FIG. 4, RLC messages 403 and 406 are received from the LTE network 101 at the RLC layer. The sequence number SN=Y of RLC message 403 and SN=Z of RLC message 406 may be provided in the RLC header of the respective message and the timestamps for the RLC messages 403 and 406 may be computed by the UE 108 as an absolute time of receipt. The RLC layer transfers a PDCP PDU 405 and 408 based on the received RLC messages 403 and 406 to the PDCP layer. For example, PDCP PDU 405 includes segments of information, which information was received in RLC message 403. PDCP PDU 408 includes segments of information, which information was received in RLC message 406.

When a security mode failure message is sent, for example, in response to a failure with the integrity check on the security mode command or the UE 108 not supporting the security mode to be implemented in response to the security mode command, managing the received PDU segments includes: not applying security to the received PDU segments having sequence numbers greater than the sequence number of the received security mode command and timestamps greater than the timestamp of the acknowledgement; and ignoring the received PDU segments having sequence numbers greater than the sequence number of the received security mode command and timestamps less than the timestamp of the acknowledgement. Not applying security includes processing the received PDU segments having sequence numbers greater than the sequence number of the received security mode command and timestamps greater than the timestamp of the acknowledgement as unciphered segments.

Thus, with reference to the example shown in FIG. 4, when the security mode is not activated in the UE 108 and the security mode failure message is sent, for each PDCP PDU segment based on a RLC message 406 having SN=Z, if Z>X and the timestamp of the PDCP PDU segment is greater than the timestamp of the RLC ACK message 404 (T for ACK), then the PDCP PDU segment will be managed as an unciphered segment. For each PDCP PDU segment based on a RLC message 403 having SN=Y, if Y>X and the timestamp of the PDCP PDU segment is less than the timestamp of the RLC ACK message 404 (T for ACK) because it has been received before the RLC ACK message 404, then the PDCP PDU segment will be ignored and discarded. In this last case, the UE 108 does not know whether the received segment is ciphered or unciphered and so does not know whether to apply decryption or not. If the UE 108 interprets the received segment as an unciphered segment when it is ciphered, the UE may misinterpret the segment. By ignoring received segments until the acknowledgement is received, the UE 108 avoids misinterpreting segments.

When a security mode complete message is sent, for example, in response to a valid integrity check on the security mode command and the UE 108 determining it can support the security mode to be implemented in response to the security mode command, managing includes applying security to the received PDU segments having sequence numbers greater than the sequence number of the received security mode command and timestamps greater than the timestamp of the acknowledgement or timestamps after the security mode complete message is sent. Applying security includes processing the received PDU segments having sequence numbers greater than the sequence number of the received security mode command and timestamps greater than the timestamp of the acknowledgement or timestamps after the security mode complete message is sent as ciphered messages.

Thus, with reference to the example shown in FIG. 4, when the security mode is activated in the UE 108 and the security mode complete message is sent, for each PDCP PDU segment based on a RLC message having SN=Z, if Z>X and the timestamp of the PDCP PDU segment is greater than the stored timestamp (T for ACK) or if the timestamp is after the sending of the security mode complete message, then the PDCP PDU segment will be managed as a ciphered segment.

When a security mode failure message is sent or a security mode complete message is sent, managing the received PDU segments includes: not applying security to the received PDU segments having sequence numbers less than the sequence number of the received security mode command and timestamps after the security mode complete message is sent. Not applying security includes processing the received PDU segments having sequence numbers less than the sequence number of the received security mode command and timestamps after the security mode complete message is sent. Thus, with reference to the example shown in FIG. 4, if an old RLC message with SN<X was retransmitted due to bad radio conditions and a PDCP PDU based on this old RLC message is received after the security mode command has been received by the UE 108, then it is probably not ciphered so the UE should interpret it as non-ciphered.

Once the UE (e.g. PDCP layer) has determined how each of the received PDU segments are to be managed, the PDCP layer informs the RRC/NAS layers that security is to be applied or not and in the case when security is to be applied, the PDCP layer also informs the RRC/NAS layers of the security algorithms and security parameters to be applied. The PDCP layer transfers segments to the RRC/NAS layers as PDCP Service Data Units (SDU) (PDCP SDU 410 in the example shown in FIG. 4). The SRB AS ciphered segments are deciphered (decrypted) at the RRC layer and their integrity checked.

As soon as the checks have been successfully completed on receipt of the security mode command, the UE 108 activates the security mode and starts ciphering (encrypting) messages to be sent to the LTE network 101. Thus, once the acknowledgement has been received at the UE 108, the LTE network 101 and UE 108 are in synchronization and are applying the same security.

As discussed in the introduction, in the time between the LTE network 101 sending the security mode command and the LTE network 101 sending the acknowledgement to the security mode complete/failure message, the prior art UEs may misinterpret messages from the LTE network 101 by not applying the same security as the LTE network 101 or may apply security to messages sent to the LTE network 101 which is not in line with the security being applied by the LTE network 101.

By managing the received PDU segments in response to the comparisons of sequence numbers and timestamps and the sending of a security mode complete/failure message, the method in accordance with the disclosure can avoid or substantially reduce misunderstandings between the UE and LTE network over ciphered or un-ciphered messages transmitted between the UE and LTE network. This reduces the number of occurrences of de-synchronisation between the UE and network with respect to the security mode used. For example, the situation where the UE stays in connected mode forever because the UE cannot interpret/decipher any message the network sends it can be avoided.

Although examples have been described above with respect to an AS security mode procedure, it will be appreciated that the described method in accordance with the disclosure may be used with other security procedures, such as a NAS security mode procedure and it is not intended to limit the disclosure to AS security mode procedures.

In the foregoing specification, the disclosure has been described with reference to specific examples of embodiments of the disclosure. It will, however, be evident that various modifications and changes may be made therein without departing from the broader scope of the disclosure.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program and system/device elements are merely illustrative and that alternative embodiments may merge elements or impose an alternate decomposition of functionality upon various elements.

We claim:

1. A method of implementing security in a wireless communication device, the method comprising:
   receiving, at the device, a security mode command for activating a security mode in the device and storing a sequence number of the received security mode command;
   sending a security mode complete or failure message based on whether a security mode is activated in the device;
   receiving an acknowledgement of the security mode complete or failure message and storing a timestamp of the acknowledgement;
   receiving a Packet Data Unit (PDU) and comparing sequence numbers and timestamps of segments of the received PDU with the stored sequence number of the received security mode command and the timestamp of the acknowledgement; and managing the received PDU segments in response to the comparisons, and the sending of the security mode complete or security mode failure message.

2. The method of claim 1 wherein when a security mode failure message is sent, managing includes:
not applying security to the received PDU segments having sequence numbers greater than the sequence number of the received security mode command and timestamps greater than the timestamp of the acknowledgement; and
ignoring the received PDU segments having sequence numbers greater than the sequence number of the received security mode command and timestamps less than the timestamp of the acknowledgement.

3. The method of claim 2 wherein not applying security includes processing the received PDU segments having sequence numbers greater than the sequence number of the received security mode command and timestamps greater than the timestamp of the acknowledgement as unciphered segments.

4. The method of claim 1 wherein when a security mode complete message is sent, managing includes:
applying security to the received PDU segments having sequence numbers greater than the sequence number of the received security mode command and timestamps greater than the timestamp of the acknowledgement or timestamps after the security mode complete message is sent.

5. The method of claim 4 wherein applying security includes processing the received PDU segments having sequence numbers greater than the sequence number of the received security mode command and timestamps greater than the timestamp of the acknowledgement or timestamps after the security mode complete message is sent as ciphered messages.

6. The method of claim 1 wherein the security mode command is encapsulated in a Radio Link Control (RLC) message and storing a sequence number includes storing a RLC sequence number of the RLC message.

7. The method of claim 1 wherein the received PDU is a Packet Data Convergence Protocol (PDCP) PDU.

8. A wireless communication device including:
a transmitter;
a receiver for receiving a security mode command for activating a security mode in the device; and
a processing unit communicably coupled to the transmitter and receiver, the processing unit being configured to:
store a sequence number of the received security mode command;
send a security mode complete or failure message based on whether a security mode is activated in the device;
receive an acknowledgement of the security mode complete or failure message and store a timestamp of the acknowledgement;
receive a PDU and compare sequence numbers and timestamps of segments of the received PDU with the stored sequence number of the received security mode command and the timestamp of the acknowledgement; and
manage the received PDU segments in response to the comparisons, and the sending of the security mode complete or security mode failure message.

9. The wireless communication device of claim 8 wherein the processing unit is configured to manage the received PDU segments when a security mode failure message is sent by:
not applying security to the received PDU segments having sequence numbers greater than the sequence number of the received security mode command and timestamps greater than the timestamp of the acknowledgement; and
ignoring the received PDU segments having sequence numbers greater than the sequence number of the received security mode command and timestamps less than the timestamp of the acknowledgement.

10. The wireless communication device of claim 9 wherein the processing unit is configured to process the received PDU segments having sequence numbers greater than the sequence number of the received security mode command and timestamps greater than the timestamp of the acknowledgement as unciphered segments.

11. The wireless communication device of claim 8 wherein the processing unit is configured to manage the received PDU segments when a security mode complete message is sent by:
applying security to the received PDU segments having sequence numbers greater than the sequence number of the received security mode command and timestamps greater than the timestamp of the acknowledgement or timestamps after the security mode complete message is sent.

12. The wireless communication device of claim 11 wherein the processing unit is configured to process the received PDU segments having sequence numbers greater than the sequence number of the received security mode command and timestamps greater than the timestamp of the acknowledgement or timestamps after the security mode complete message is sent as ciphered messages.

13. The wireless communication device of claim 8 wherein the security mode command is encapsulated in a RLC message and the sequence number is a RLC sequence number of the RLC message encapsulating the security mode command.

14. The wireless communication device of claim 8 wherein the received PDU is a PDCP PDU.

15. The wireless communication device of claim 8 wherein the processing unit is configured to manage the received PDU segments when a security mode failure message or a security mode complete message is sent by:
not applying security to the received PDU segments having sequence numbers less than the sequence number of the received security mode command and timestamps after the security mode failure message or security mode complete message is sent.

\* \* \* \* \*